Figure 1:
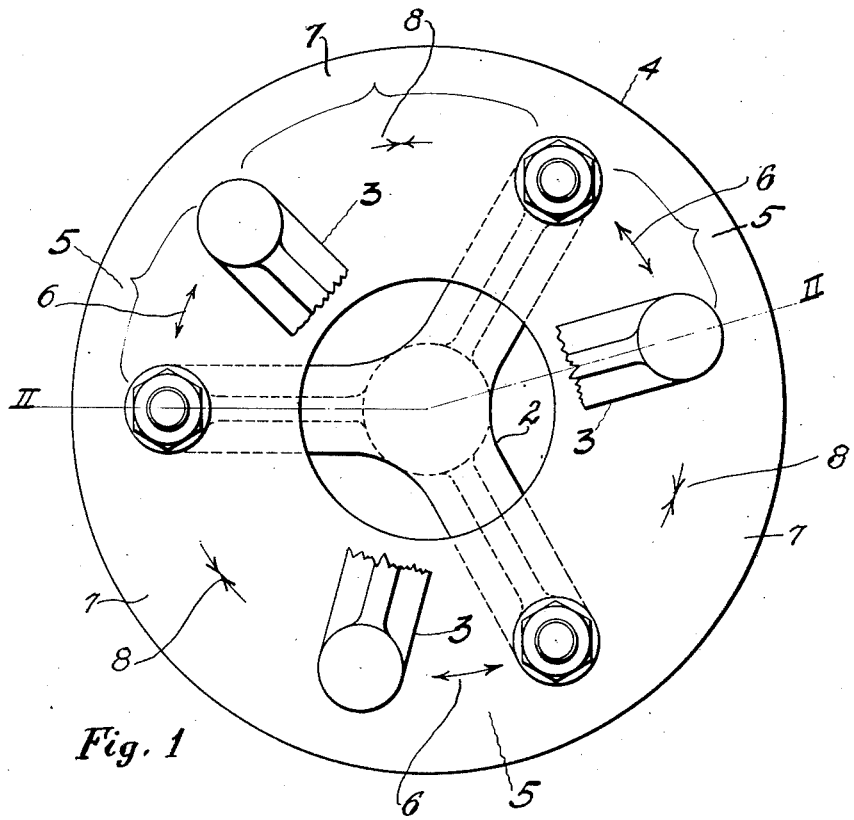

March 6, 1928. 1,662,006

E. G. KIMMICH

FLEXIBLE COUPLING

Filed Jan. 26, 1923

Inventor

ELMER G. KIMMICH

By

*R. C. Wagner*
Attorney

Patented Mar. 6, 1928.

1,662,006

UNITED STATES PATENT OFFICE.

ELMER G. KIMMICH, OF AKRON, OHIO, ASSIGNOR TO THE GOODYEAR TIRE & RUBBER COMPANY, OF AKRON, OHIO, A CORPORATION OF OHIO.

FLEXIBLE COUPLING.

Application filed January 26, 1923. Serial No. 615,162.

My invention relates to flexible couplings and it is particularly directed to discs that are adapted to be interposed between the driving and driven members of such couplings.

The flexible discs herein considered are applicable to any one of a large class of couplings of conventional design that are interposed between the units of motor generator sets, in automobile power transmission systems and in other similar apparatus. Because of the conventional character of couplings of this general nature it is deemed sufficient to illustrate only a part of the coupling together with the disc that is used in the coupling without showing in their entirety the cooperating driving and driven members of the coupling.

It has been found in service that discs of this general type are often completely worn through in the compression sector of the disc before the material of the tension zone of the discs shows an appreciable degree of wear. A closer study for the reason of this early destruction of the compression sector of the discs develops the fact that the material of this zone is not only compressed but is subjected to a violent shearing movement, by reason of the continued relative shifting of the driving and driven studs relative to each other which produces such internal friction that the destruction of the disc soon results. The destructive wear of the disc therefore develops in the compression zone of the disc rather than in the tension zone of the disc and it is particularly aggravated by any bulge in the material in the compression zone resulting from the stretching of material in the tension zone of the disc.

If some means could be provided for absorbing the compression to which this zone of the disc is subjected, the life of the disc would be greatly multiplied. Some degree of extensibility between the driving holes is essential however, because of the movement of the coupling members which continuously changes the strain on the material between adjacent driving holes if the driving and driven shafts are out of alignment or are eccentric.

The object of my invention is to provide a flexible disc that is so constructed as to reduce the flexing of the disc in the tension zones and therefore to minimize the compression of the material of the disc in the compression zone and to provide a greater compression zone for the more effective absorption of the compressive stresses in the disc.

In accordance with this principle, my invention contemplates such an unequal spacing of the driving holes of the disc as to limit the extension of the tension zone of the disc and to provide a greater zone of material in the compression sector to thus obtain the greatest wear from the disc without materially decreasing its satisfactory operation.

Figure 2:
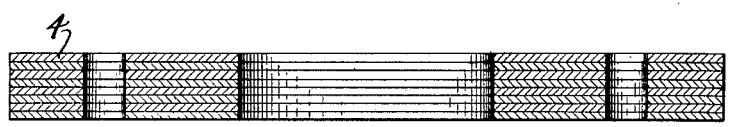

Fig. 1 of the accompanying drawing is a plan view of a flexible coupling having parts broken away and embodying a disc constructed in accordance with my invention; and Fig. 2 is a cross-sectional view of the disc shown in Fig. 1, taken substantially on the line II—II.

Referring particularly to the drawing, I have chosen to illustrate my invention as applied to a form of flexible connection embodying a driving member 2 that is flexibly connected to a driven member 3 by means of an interposed disc 4. The driving and driven members may be secured to the flexible disc 4 in any conventional manner although I have illustrated a disc which is secured to the respective members by means of suitable driving lugs that extend thru holes formed in the disc.

The zones 5 of the disc that are located between the points of connection of the disc to the driving spider 2 and the driven spider 3 are subjected to tension forces during operation of the disc as illustrated by the arrows 6 appearing within these sectors, and the remaining zones 7 of the disc are subjected to compression forces by reason of the stretching of the segments 5. The presence of these forces is indicated by the arrows 8 that are shown within these sectors as pointing toward each other. By decreasing the length of the tension sectors 5, the stretching of these sectors is proportionately reduced and the compression zone of the disc 4 is necessarily extended. A more extensive compression zone is thereby provided which more effectively absorbs the reduced stretch developed in the tension zone of the disc than is the case of discs joined to the arms of the driving and driven members at points equally spaced around the disc.

By thus proportioning the distance between the points of connection to the disc of the driving member and of the driven member, the degree of extensibility of the disc in the tension sector can be so reduced as to substantially remove all signs of wear from the compression sector of the disc and to cause the tension sector of the disc to wear out before substantial wear is shown in the compression sector which is the reverse of the conditions present in the conventional form of disc. There is, however, a proportionate position for these points of connection that reduces the destructive wear on the compression zone 7 to a minimum and that increases the wear on the tension sector 5 to such a point that the disc destructive wear in both sectors is substantially the same rather than a predominant destructive wear in either one or the other sector. In fact if a disc of this nature were absolutely uniform throughout as regards material and connection to the coupling members, the proportion could be so adjusted that failure would result simultaneously in both the compression and tension zones of the disc, and it is toward this condition that my invention is directed.

Although I have illustrated and described but a single application of my invention, it can obviously be applied to a great variety of discs of this general class and formed of any flexible material that is usually incorporated in discs intended for this purpose. I desire therefore, that only such limitations shall be imposed as are indicated in the spirit and scope of the appended claims.

What I claim is:

1. A flexible disc for driving connections having a set of holes for connecting the disc to a driving member and a set of holes for connecting the disc to a driven member, the sets of holes being so disposed that radii of the disc passing over the centers of the holes define tension zones and larger intermediate compression zones.

2. A flexible disc for driving connections having two sets of equally spaced driving holes, the sets of holes being so disposed that radii of the disc passing over the centers of the holes define tension zones and larger compression zones.

3. A flexible coupling comprising driving and driven members each provided with a plurality of spaced angularly disposed arms respectively secured to the opposite side faces of a flexible disc interposed between the driving and driven members; said arms dividing the disc into a plurality of alternate compression and tension zones, the compression zones being of materially greater area than the tension zones.

In witness whereof, I have hereunto signed my name.

ELMER G. KIMMICH.